United States Patent
Takahashi et al.

(10) Patent No.: US 10,118,328 B2
(45) Date of Patent: Nov. 6, 2018

(54) FORMING MOLD UNIT AND MANUFACTURING APPARATUS FOR FORMING HANDLE-EQUIPPED CONTAINER

(71) Applicant: NISSEI ASB MACHINE CO., LTD., Nagano (JP)

(72) Inventors: Tsuyoshi Takahashi, Nagano (JP); Yuji Sakabe, Nagano (JP)

(73) Assignee: NISSI ASB MACHINE CO., LTD., Nagano (JP)

( * ) Notice: Subject to any disclaimer, the term of this patent is extended or adjusted under 35 U.S.C. 154(b) by 11 days.

(21) Appl. No.: 15/300,171

(22) PCT Filed: Mar. 26, 2015

(86) PCT No.: PCT/JP2015/059465
§ 371 (c)(1),
(2) Date: Sep. 28, 2016

(87) PCT Pub. No.: WO2015/147207
PCT Pub. Date: Oct. 1, 2015

(65) Prior Publication Data
US 2017/0136678 A1    May 18, 2017

(30) Foreign Application Priority Data
Mar. 28, 2014    (JP) ................. 2014-068648

(51) Int. Cl.
*B29C 49/20* (2006.01)
*B29C 49/30* (2006.01)
(Continued)

(52) U.S. Cl.
CPC .............. *B29C 49/20* (2013.01); *B29C 49/30* (2013.01); *B29C 49/4236* (2013.01);
(Continued)

(58) Field of Classification Search
CPC .... B29C 2049/2039; B29C 2049/2073; B29C 49/20; B29C 49/30; B29C 49/4236; B29C 31/008
(Continued)

(56) References Cited

U.S. PATENT DOCUMENTS 5,167,970 A    12/1992 Yoshino et al.
5,560,506 A  * 10/1996 Yanagisawa .......... B29C 31/008
215/396
(Continued)

FOREIGN PATENT DOCUMENTS

EP    1204524 A1    7/2000
JP    08072131        3/1996
(Continued)

OTHER PUBLICATIONS

International Search Report, dated Jun. 23, 2015, for International Application No. PCT/JP2015/059465.
(Continued)

*Primary Examiner* — Robert B Davis
(74) *Attorney, Agent, or Firm* — David L. Hoffman; Hoffman Patent Group

(57) ABSTRACT

A forming mold (311) is configured to include: a pair of split mold bodies (312) in which an intermediate molded product (61) is accommodated; a pair of handle holding split molds (312) provided in the split mold bodies (315) so as to be slidable in a direction orthogonal to the opening and closing direction of the split mold bodies, and sandwiching a handle (30) therebetween; and driving means (313) connected to the handle holding split molds (312) for sliding the handle holding split molds individually.

10 Claims, 12 Drawing Sheets

(51) Int. Cl.
  *B29C 49/54* (2006.01)
  *B29C 49/48* (2006.01)
  *B29C 49/42* (2006.01)
  *B29D 22/00* (2006.01)
  *B65D 1/02* (2006.01)
  *B65D 23/10* (2006.01)
  *B65D 43/02* (2006.01)
  *B29K 67/00* (2006.01)
  *B29K 105/00* (2006.01)
  *B29K 667/00* (2006.01)
  *B29L 31/00* (2006.01)

(52) U.S. Cl.
  CPC .......... *B29C 49/4802* (2013.01); *B29C 49/54* (2013.01); *B29D 22/003* (2013.01); *B65D 1/0207* (2013.01); *B65D 23/10* (2013.01); *B65D 43/02* (2013.01); *B29C 49/4815* (2013.01); *B29C 2049/2039* (2013.01); *B29C 2049/4807* (2013.01); *B29K 2067/003* (2013.01); *B29K 2105/258* (2013.01); *B29K 2667/003* (2013.01); *B29L 2031/7158* (2013.01)

(58) Field of Classification Search
  USPC .......................................................... 425/525
  See application file for complete search history.

(56) References Cited

U.S. PATENT DOCUMENTS

| | | | |
|---|---|---|---|
| 7,003,870 B2 * | 2/2006 | Yu | B29C 49/20 29/527.2 |
| 2004/0130074 A1 * | 7/2004 | Yu | B29C 49/482 264/523 |

FOREIGN PATENT DOCUMENTS

| | | | |
|---|---|---|---|
| JP | 2544847 B2 * | 10/1996 | B29C 49/20 |
| JP | 2000108195 | 4/2000 | |
| JP | 2002172682 | 6/2002 | |
| JP | 2006103003 | 4/2006 | |
| WO | 01/07233 A1 | 2/2001 | |
| WO | WO2011030208 A2 | 3/2011 | |

OTHER PUBLICATIONS

Extended European Search Report, dated Oct. 20, 2017 for Application No. EP 15768742.7.

\* cited by examiner

FORMING MOLD UNIT AND MANUFACTURING APPARATUS FOR FORMING HANDLE-EQUIPPED CONTAINER

TECHNICAL FIELD

This application is a U.S. national stage application of International Patent Application No. PCT/JP2015/059465, having an international filing date of Mar. 26, 2015, which designated the United States and which claims priority from Japanese Patent Application No. 2014-068648, filed on Mar. 28, 2014, the entirety of both of which are incorporated herein by reference.

This invention relates to a forming mold unit for forming a handle-equipped container, and a manufacturing apparatus provided with the forming mold unit for manufacturing a handle-equipped container.

BACKGROUND ART

So far, large containers having a volume of the order of 3 gallons (about 12 liters) or 5 gallons (about 20 liters) have been adopted worldwide, for example, as refillable bottles for mineral water. Such large containers are generally formed of a resin material and, if empty, they are lightweight and relatively easy to carry. If they are filled with mineral water, however, the containers are considerably heavy and difficult to carry. Thus, in order to make large containers easy to carry, some of them are provided with a handle, which extends along the axial direction (vertical direction) of the trunk, on the outer periphery of the container body (plastic bottle).

By mounting such a handle on the container body, it becomes easy to carry the large container. However, the problem exists that the mounting strength of the handle on the container body cannot be sufficiently enhanced. For example, polycarbonate resin is generally used as a material for a large container. In recent years, however, polyethylene terephthalate (PET) resin has come to be used, and even the use of PET resin as a material for a large container poses the above-mentioned problem. For example, a large container, such as a refillable bottle for mineral water, is normally recovered from a consumer after use, washed with a cleaning fluid at a temperature of the order of 65° C. (hot water washing), and recycled a plurality of times. When PET resin is used as a material for the container body, therefore, it is necessary to mount a handle on the container body firmly while imparting heat resistance to the container body. However, it has been difficult to firmly mount the handle onto the container body while imparting heat resistance to the container body.

To solve such problems, a proposal has been made for an apparatus adapted to push a handle into the body of a mold with a predetermined timing when forming a handle-equipped large container. For example, there is an apparatus equipped with a blow mold (mold body) and a handle insertion device, and configured to insert a handle into the blow mold by the handle insertion device while a preform is being stretched and expanded by an air blow (see Patent Document 1).

PRIOR ART DOCUMENTS

Patent Documents

Patent Document 1: JP-A-2006-103003

SUMMARY OF THE INVENTION

Problems to be Solved by the Invention

Inserting the handle into the mold body at a predetermined timing, as mentioned above, is expected to be capable of enhancing the mounting strength of the handle with respect to the container body made of resin.

The apparatus described in Patent Document 1, however, involves the problem that its manufacturing efficiency is low, because the handle is inserted into the mold body by the handle insertion device provided separately from the blow mold.

With the apparatus described in Patent Document 1, for example, the insertion device is installed on the side of the blow mold. Thus, the carry-out of a handle-equipped container from the blow mold, and the carry-in of an intermediate molded product including a preform into the blow mold cannot be simultaneously performed laterally of the blow mold laid in a mold-opened state. That is, the carry-out of the handle-equipped container from the blow mold, and the carry-in of the intermediate molded product including the preform into the blow mold need to be performed at different timings, thus posing the problem that the production of the handle-equipped container takes time.

If, in the above-mentioned apparatus, the carry-out of the handle-equipped container from the blow mold, and the carry-in of the intermediate molded product including the preform into the blow mold are to be performed at the same time, the carry-out and the carry-in need to be executed, for example, from above the blow mold. This manner of execution, compared with the carry-out and the carry-in executed from the side of the blow mold in the mold-opened state, lengthens a transport distance covered by the handle-equipped container or the intermediate molded product including the preform, and makes the production time long. These problems are left unsolved.

The present invention has been accomplished in the light of the above circumstances. It is an object of the invention to provide a forming mold unit for a handle-equipped container, which can improve the mounting strength of a handle with respect to a container body made of resin, and can increase a manufacturing efficiency; and a manufacturing apparatus provided with the forming mold unit for manufacturing a handle-equipped container.

Means for Solving the Problems

A first aspect of the present invention for solving the problems mentioned above is a forming mold unit for forming a handle-equipped container by blow molding an intermediate molded product, while disposing the intermediate molded product and a handle for a container within a forming mold, wherein the forming mold comprises: a pair of split mold bodies in which the intermediate molded product is accommodated; a pair of handle holding split molds provided in the split mold bodies so as to be slidable in a direction orthogonal to the opening and closing direction of the split mold bodies, and sandwiching the handle therebetween; and driving means connected to the handle holding split molds for sliding the handle holding split molds individually.

According to the first aspect, the carry-out of the handle-equipped container from the mold body, and the carry-in of the intermediate molded product into the mold body can be performed simultaneously from the side of the mold body placed in a mold-opened state. The term "intermediate molded product" herein includes not only a blow molded product of a preform, but also the preform itself.

A second aspect of the present invention is the forming mold unit according to the first aspect, further comprising a synchronization mechanism for synchronizing sliding movements of the pair of handle holding split molds.

According to the second aspect, the sliding movements of the pair of handle holding split molds are synchronized, whereby the positioning of the handle can be performed highly accurately.

A third aspect of the present invention is the forming mold unit according to the second aspect, wherein the synchronization mechanism is composed of an engaging protrusion provided in one of the handle holding split molds, and an engaging recess provided in the other of the handle holding split molds for engagement with the engaging protrusion.

According to the third aspect, the synchronization mechanism can be realized by a relatively simple structure.

A fourth aspect of the present invention is a manufacturing apparatus for a handle-equipped container, comprising the forming mold unit according to any one of the first to third aspects.

According to the fourth aspect, the production efficiency of a handle-equipped container can be increased.

A fifth aspect of the present invention is the manufacturing apparatus for a handle-equipped container according to the fourth aspect, further comprising transport means for performing carry-out of the handle-equipped container from the forming mold, and transport of the intermediate molded product to the forming mold, simultaneously in the direction orthogonal to the opening and closing direction of the split mold bodies.

According to the fifth aspect, the transport times of the handle-equipped container and the intermediate molded product can be shortened. Eventually, the manufacturing time of the handle-equipped container can be shortened.

Effects of the Invention

According to the present invention, as described above, the production efficiency of the handle-equipped container can be improved. Moreover, the mounting strength of the handle with respect to the container body made of resin can be enhanced by inserting the handle into the mold body at an appropriate timing.

MODE FOR CARRYING OUT THE INVENTION

An embodiment of the present invention will be described in detail by reference to the accompanying drawings.

A handle-equipped container to be formed by a manufacturing apparatus for a handle-equipped container according to the present invention will be described first.

Figure 1A:
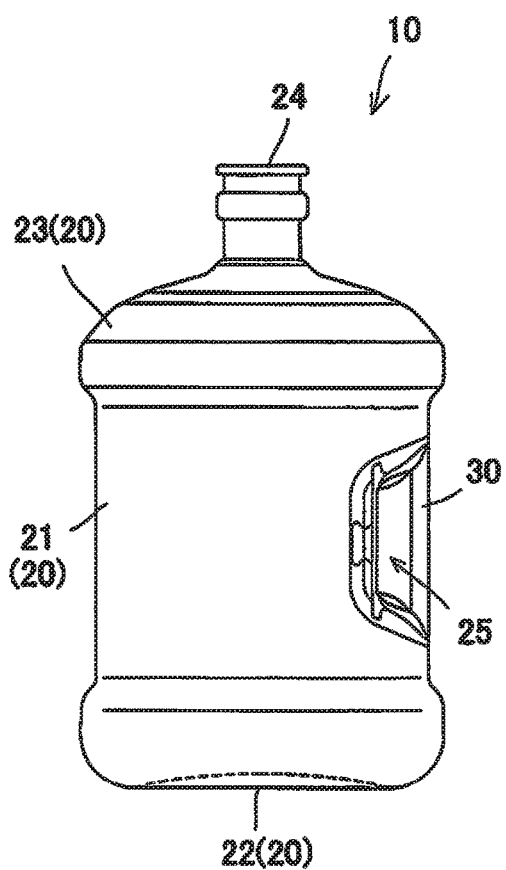
FIGS. 1A, 1B are views showing an example of a handle-equipped container, FIG. 1A being a side view, and FIG. 1B a front view as viewed from the handle side.
Figure 1B:
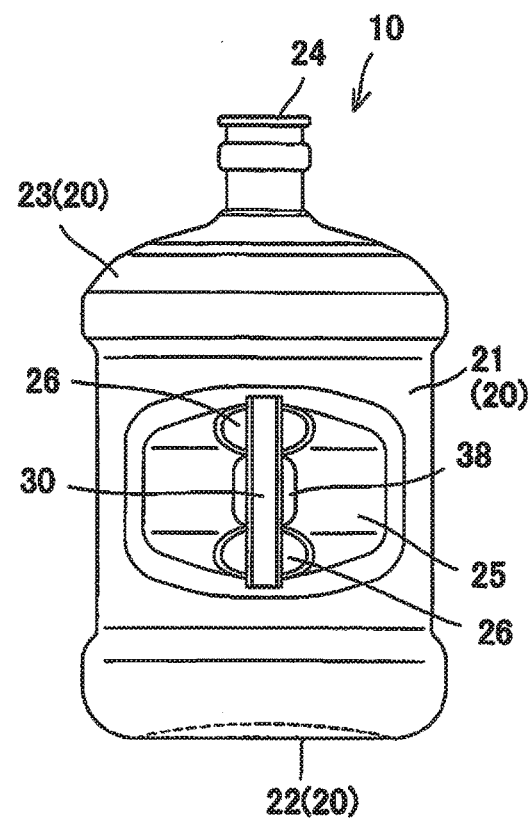

As shown in FIGS. 1A, 1B, a handle-equipped container 10 comprises a container body 20 and a handle (handle for container) 30. The container body 20 is formed of a polyethylene terephthalate (PET) resin. The container body 20 has a trunk 21 formed in a cylindrical shape, a bottom 22 constituting the bottom surface of the trunk 21, and a shoulder 23 constituting an upper part above the trunk 21. The container body 20 also has a mouth 24 at the center of an upper part thereof, and the shoulder 23 is provided between the mouth 24 and the trunk 21. Into the container body 20, a liquid is flowed through the mouth 24. Also, the liquid inside the container body 20 is flowed out through the mouth 24. A lid (not shown) can be mounted on and removed from the mouth 24 and, when mounted on the mouth 24, seals the container body 20.

The trunk 21 has a handle mounting portion 25 on a part of its circumferential surface. The handle mounting portion 25 is formed into a nearly concavely recessed shape in a side view. The handle mounting portion 25 is mounted with the handle 30 at the center in a front view.

Figure 2:
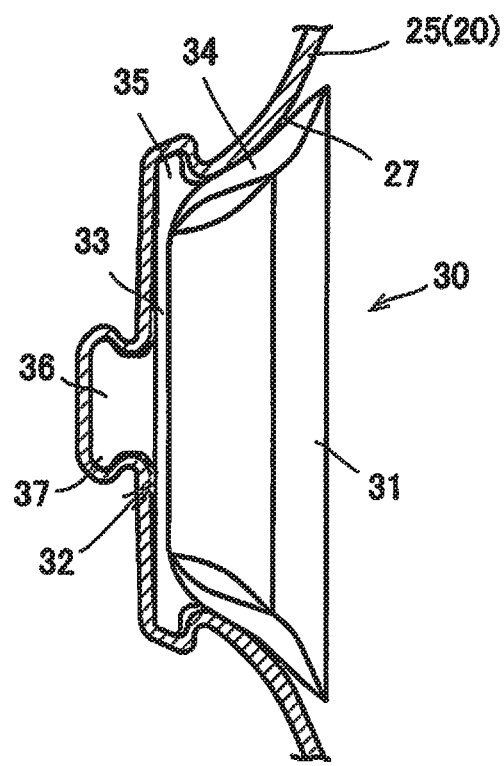
FIG. 2 is a partial sectional view, on an enlarged scale, of a handle portion of the handle-equipped container.

The handle 30 is molded, for example, from a polypropylene (PP) resin or a polyethylene terephthalate (PET) resin. The handle 30, as shown in FIG. 2, has a grip portion 31 formed like a rod, and a fixing portion 32 coupled to the grip portion 31. The grip portion 31 is a portion which an operator grips when the handle-equipped container 10 is carried, for example. The fixing portion 32 is a portion to be fixed to the container body 20.

The fixing portion 32 has a mounting bar part 33 disposed nearly parallel to, and at a distance from, the grip portion 31, and coupling parts 34 extending from the upper and lower ends of the mounting bar part 33 toward the upper and lower ends of the grip portion 31 for coupling to the upper and lower ends of the grip portion 31. The mounting bar part 33 has, formed at its upper and lower end sites, locking parts 35 projecting nearly upward and downward. The mounting bar part 33 is also formed with, at a vertically intermediate site thereof, an engaging projection 36 protruding to the side opposite to the grip portion 31. The engaging projection 36 is formed with, at the leading end thereof, a jutting part 37 jutting vertically and bilaterally. At the vertically intermediate site of the mounting bar part 33, a pressing piece 38 is formed which juts out in the width direction (to the right and left) of the mounting bar part 33 (see FIG. 1B).

As shown in FIGS. 1A, 1B and FIG. 2, the handle 30 is mounted on the handle mounting portion 25 in the container body 20. In the handle mounting portion 25 of the container body 20, a plurality of chevron-shaped projections 26 are formed. These chevron-shaped projections 26 are formed on sides above and below the pressing piece 38 of the handle 30. These chevron-shaped projections 26 are formed by a part of the container body 20 bulging outward (toward the grip portion) on both sides, in the width direction, of the mounting bar part 33. The chevron-shaped projections 26 lock upper and lower end sites of the mounting bar part 33 constituting the fixing portion 32 of the handle 30, and also lock the right and left sides of the coupling parts 34. Thus, the handle 30 is restrained from moving in the horizontal direction with respect to the container body 20.

In the handle mounting portion 25 of the container body 20, a plurality of assemblage parts 27 are formed. The assemblage parts 27 are formed along the locking parts 35 and the coupling parts 34 so as to become closer to the coupling parts 34 than to the locking parts 35. The assemblage parts 27 lock the locking parts 35 of the handle 30. Thus, the handle 30 is restrained from moving in the vertical direction and the separating direction (the direction in which the handle 30 separates from the container; the direction from the mounting bar part 33 toward the grip portion 31) with respect to the container body 20.

Furthermore, a part of the container body 20 is formed along the shape of the engaging projection 36 so as to be jammed toward the mounting bar part 33 with respect to the jutting part 37 in the engaging projection 36 of the handle 30. Thus, the handle 30 is restrained from moving in the vertical direction and the separating direction with respect to the container body 20.

Next, a method for producing the handle-equipped container 10 described above will be explained briefly by reference to FIGS. 3A to 3C.

(1) Injection Molding Step and Temperature Control Step

Figure 3A:
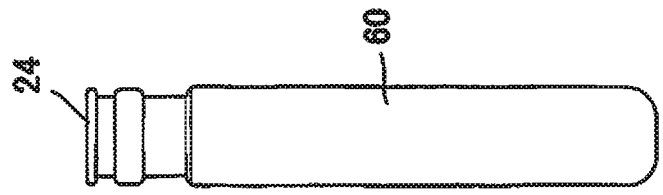
FIGS. 3A, 3B and 3C are views illustrating a method for producing the handle-equipped container.

In an injection molding step, a preform 60 to be converted into the container body 20 is injection molded, as show in FIG. 3A. The preform 60 is molded, for example, from a polyethylene terephthalate (PET) resin, and is formed in a bottomed cylindrical shape having the mouth 24 formed at its upper end. In a temperature control step, the preform 60 injection molded in the injection molding step is heated to a temperature suitable for stretching.

(2) Primary Blow Molding Step

Figure 3B:
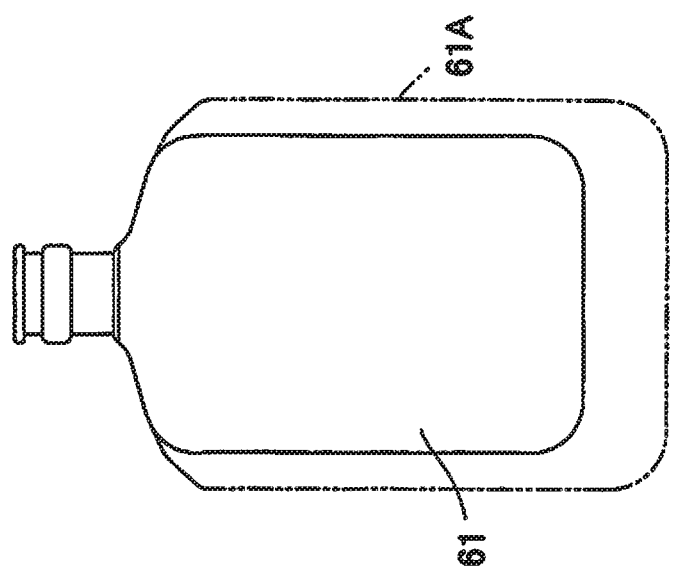

In a primary blow molding step, the preform 60 heated to the temperature suitable for stretching in the temperature control step is subjected to blow molding to mold an intermediate molded product 61 smaller than the container body 20, which is a final molded product, as shown in FIG. 3B. Concretely, the preform 60 heated to the temperature suitable for stretching is blow molded to form a primary blow molded product 61A of a size larger than the intermediate molded product 61. Then, the primary blow molded product 61A shrinks, whereupon the intermediate molded product 61 at a high temperature and in a softened state is formed.

(3) Final Blow Molding Step

Figure 3C:
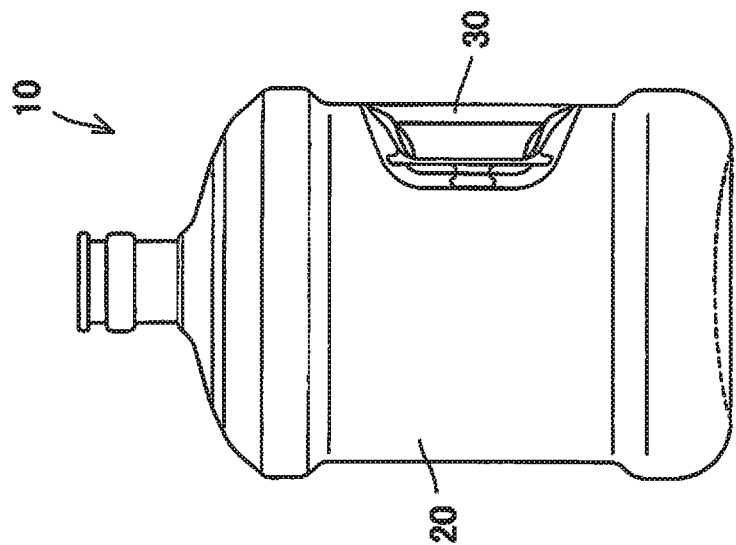

In a final blow molding step, the intermediate molded product 61 is blow molded, together with the handle 30, with the use of a final blow mold to be described later, whereby the handle-equipped container 10 is formed, as shown in FIG. 3C.

Next, an example of a manufacturing apparatus for a handle-equipped container will be described by reference to FIGS. 4A, 4B to 9A, 9B.

Figure 4A:
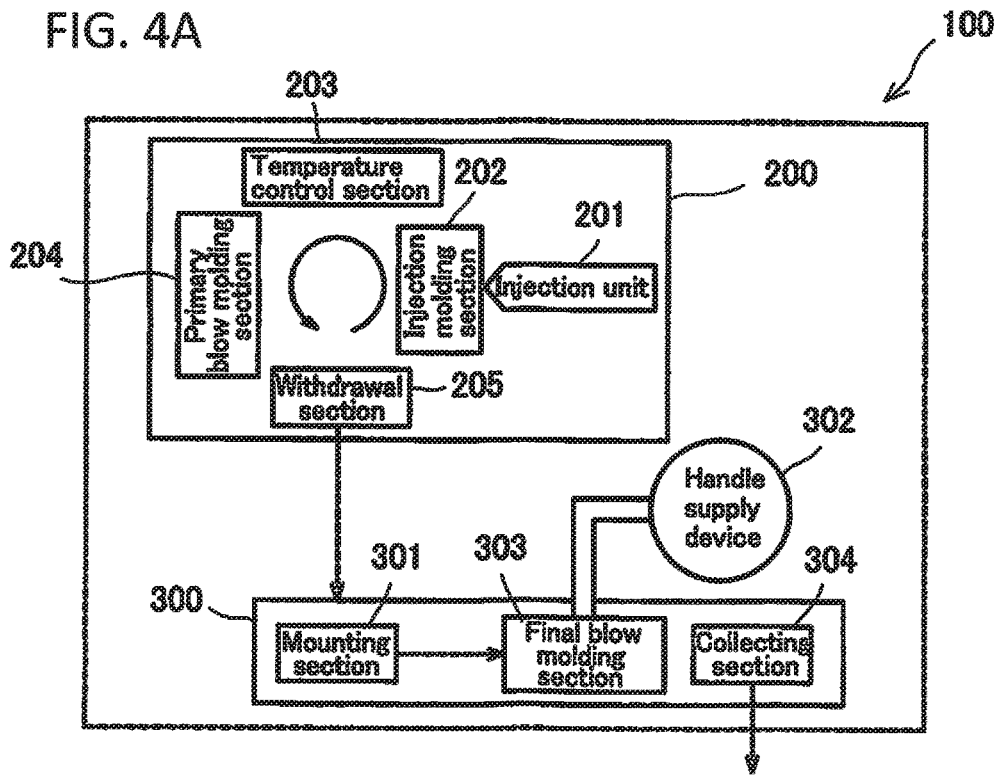
FIGS. 4A, 4B are block diagrams showing the schematic configuration of a manufacturing apparatus for the handle-equipped container according to an embodiment of the present invention.

As shown in FIG. 4A, a manufacturing apparatus 100 for a handle-equipped container according to the present embodiment comprises a first manufacturing section 200 for producing the above-mentioned intermediate molded product 61, and a second manufacturing section 300 for producing the handle-equipped container 10 from the intermediate molded product 61.

The first manufacturing section 200 includes an injection molding section 202 to which an injection unit 201 is coupled, a temperature control section 203, a primary blow molding section 204, and a withdrawal section 205. The injection molding section 202 molds the preform 60 using a resin material injected from the injection unit 201. The temperature control section 203 adjusts the temperature of the preform 60 before primary blowing. Concretely, its temperature control is performed so that the temperature of a primary blow mold (not shown) is brought to the crystallization temperature of the PET resin or higher (a temperature of the order of 140 to 180° C.) by use of a rod heater or the like.

In the primary blow molding section 204, the primary blow molded product 61A is formed from the preform 60. The primary blow molding section 204 has the primary blow mold and a blow nozzle, and introduces high pressure air into the preform 60, disposed within the primary blow mold, by use of the blow nozzle. The preform 60 having high pressure air introduced therein is stretched to contact the inner wall surface of the primary blow mold, whereby the primary blow molded product 61A is formed. At this time, the residual stress of the PET resin is relaxed, and its crystallization density is increased (heat resistance is enhanced by heat setting). Then, the high pressure air is evacuated, and the primary blow mold is opened, to withdraw the primary blow molded product 61A in a high-temperature softened state out of the primary blow mold. On this occasion (mainly during evacuation), the primary blow molded product 61A has a volume shrinking by a value of the order of 10 to 30%, turning into the intermediate molded product 61.

The withdrawal section 205 temporarily accommodates the intermediate molded product 61 formed in the primary blow molding section 204 in the above manner.

The second manufacturing section 300 includes a mounting section 301, a handle supply device 302, a final blow molding section 303, and a collection section 304. The mounting section 301 mounts the intermediate molded product 61, which has been supplied from the withdrawal section 205 of the first manufacturing section 200 by a moving means (not shown), onto a transport means (not shown) of the second manufacturing section 300. The handle supply device 302 accommodates a plurality of handles 30, and supplies the handle 30 to the final blow molding section 303 at a predetermined timing.

The final blow molding section (forming mold device) 303 sets the handle 30, which has been supplied from the handle supply device 302, and the intermediate molded product 61, which has been transported by the transport means, within the final blow mold and, in this state, introduces high pressure air into the intermediate molded product 61 by means of a blow nozzle, thereby forming the handle-equipped container 10.

The collecting section 304 recovers the handle-equipped container 10, which has been transported from the final blow molding section 303 by the transport means, and then transports the handle-equipped container 10 to a predetermined storage place, for example, by a belt conveyor.

Figure 4B:
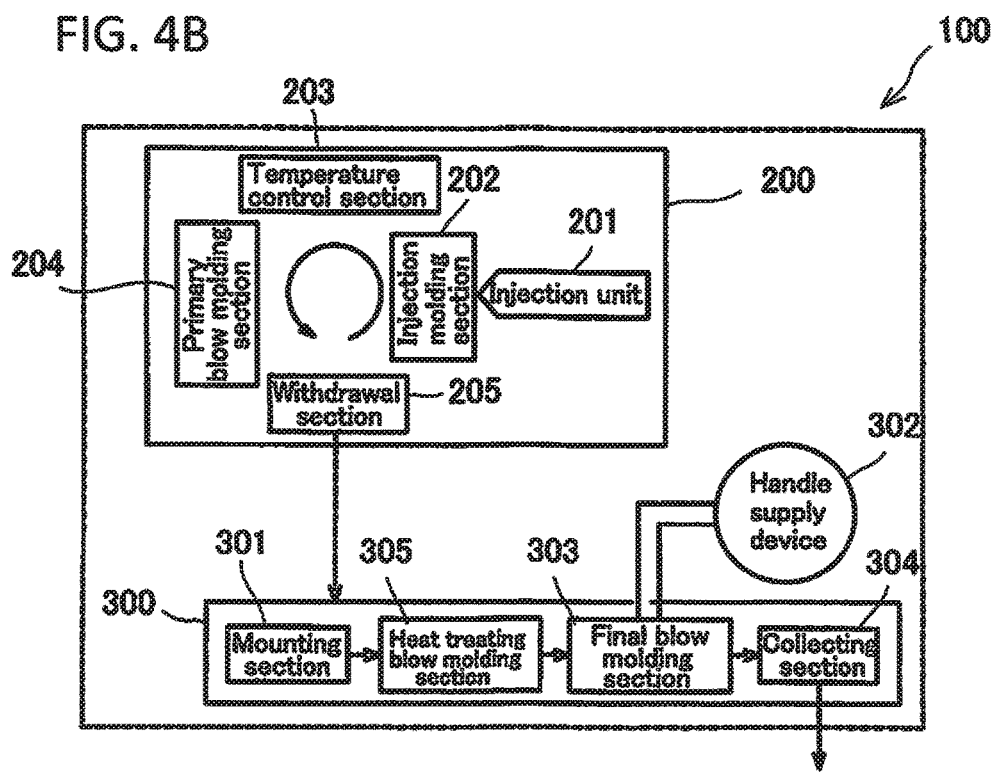

In the foregoing embodiment, heat setting is performed in the primary blow molding section 204. As shown in FIG. 4B, however, a heat treating blow molding section 305 dedicated to heat setting may be separately provided, for example, between the mounting section 301 and the final blow molding section 304. In this case, a rigid primary blow molded product 61A is molded as a result of cooling in the primary blow mold present in the primary blow molding section 204, whereas a high-temperature softened intermediate molded product 61 is molded in a heat treating blow mold of the heat treating blow molding section 305. The heat treating blow mold has a blow cavity of nearly the same shape and size as those of the primary blow mold, and is equipped with the same heating mechanism as that of the primary blow mold. In the heat treating blow molding section 305, the rigid primary blow molded product 61A accommodated within the heat treating blow mold is contacted with the cavity surface, with high pressure air being introduced thereinto, so as to undergo heat setting. Then, blown air is evacuated to mold the intermediate molded product 61 which has shrunk. To minimize the temperature fall of the intermediate molded product 61 subjected to thermoforming, it is desirable that the heat treating blow molding section 305 be disposed directly before the final blow molding section 303.

Figure 5:
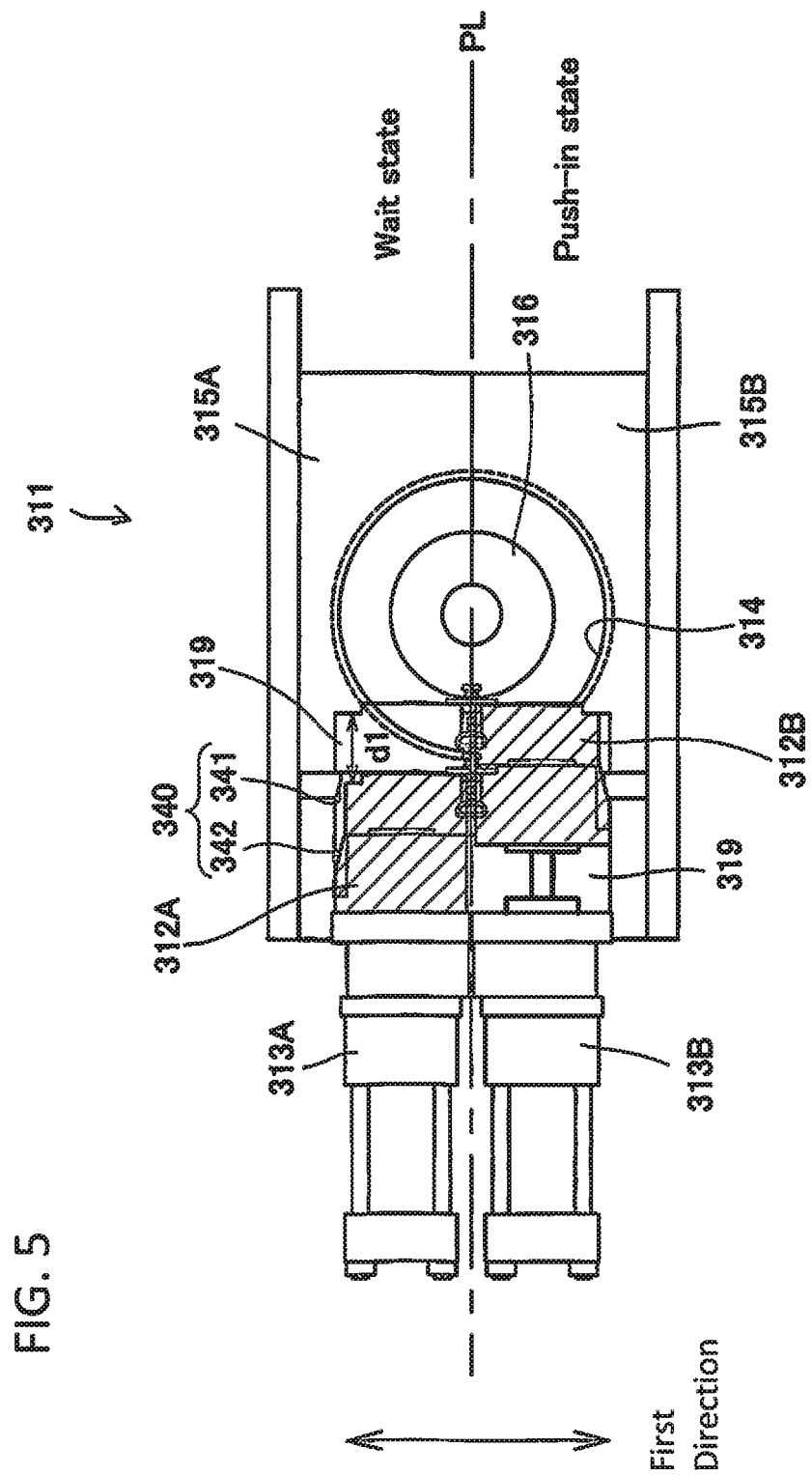
FIG. 5 is a view showing the top side of a forming mold unit according to the embodiment of the present invention.
Figure 6:
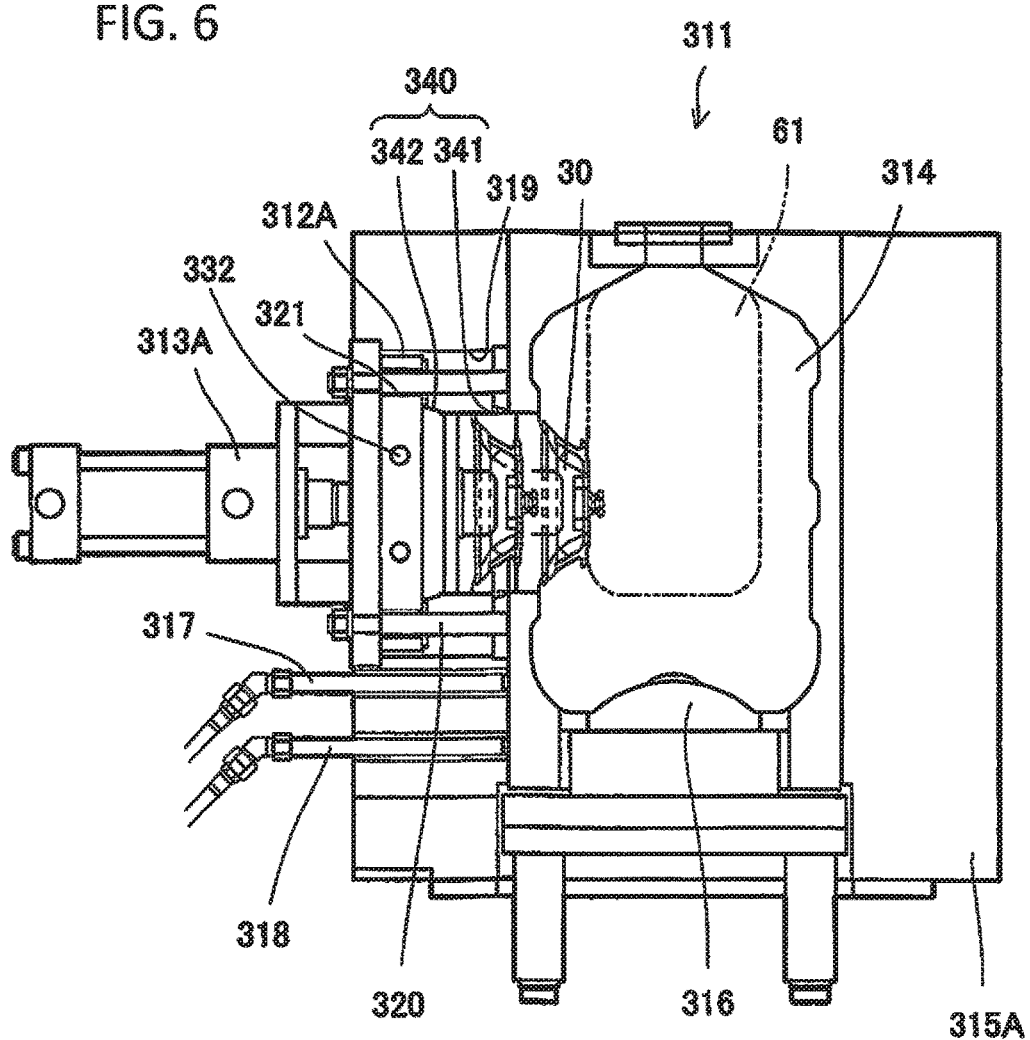
FIG. 6 is a view showing the front side of a split mold body according to the embodiment of the present invention.
Figure 7:
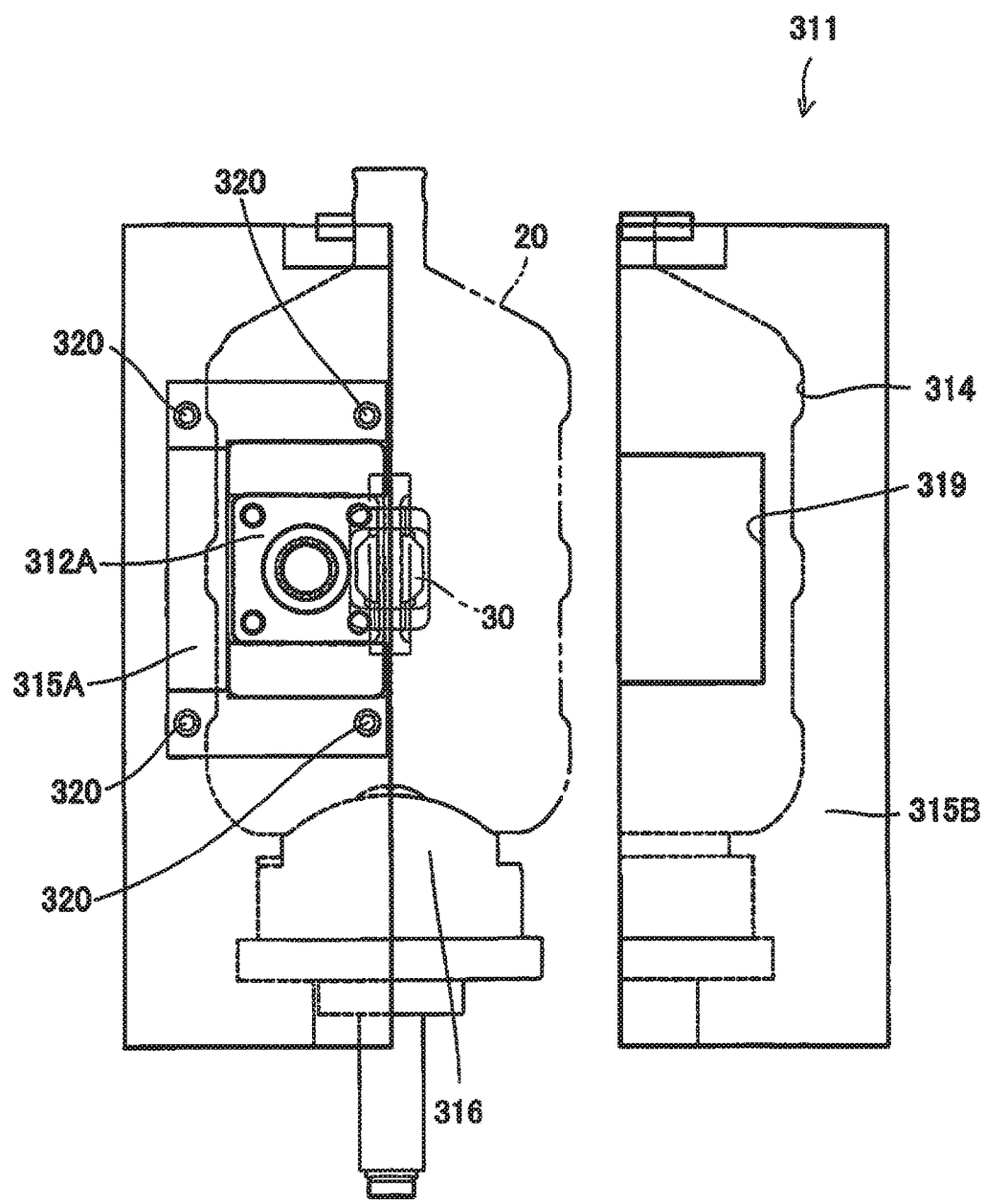
FIG. 7 is a view showing the left surface side of the forming mold unit according to the embodiment of the present invention.

The configuration of the final blow molding section (forming mold unit) 303 will be described further by reference to FIGS. 5 to 7. FIG. 5 is a view showing the top side of the final blow molding section (forming mold unit), showing a wait state after mold closure, but before a handle push-in step, on the left side of a parting line in the sheet face, and schematically showing a pressing state after the push-in step on the right side of the sheet face. FIG. 6 is a view showing the front side of a final blow split mold. FIG. 7 is a view showing the left side surface side of the final blow molding section. In FIG. 7, the final blow split mold on the right side shows a state in which a handle holding split mold has been removed.

As shown in FIGS. 5 to 7, the final blow molding section 303 is equipped with a final blow mold (mold body) 311, a pair of handle holding split molds 312 provided in the final blow mold 311, and two actuator devices (driving means) 313 for slidingly moving the handle holding split molds 312.

The final blow mold 311 has a pair of final blow split molds 315 (315A, 315B) defining a molding space 314 in which the intermediate molded product 61 is accommodated, and an raised bottom mold 316 corresponding to the bottom of the intermediate molded product 61.

To the final blow split molds 315 are connected a supply pipe 317 for supply of a temperature control medium, and a discharge pipe 318 for discharge of the temperature control medium. By circulating the temperature control medium within a supply path (not shown) provided in each final blow split mold 315, the intermediate molded product 61 disposed within the molding space 314 is heated to a predetermined temperature. The raised bottom mold 316 is also heated with the temperature control medium, as is the final blow split mold 315.

The handle holding split molds 312 (312A, 312B) are provided in the respective final blow split molds 315 so as to be slidingly movable. Concretely, in each of the final blow split molds 315, a depression 319 to be mounted with the handle holding split mold 312 is formed in one of side parts of the molding space 314 in a direction (second direction) orthogonal to a mold opening direction (first direction). In the depression 319, a plurality of guide shafts 320 are provided along the second direction (see FIG. 6). In the handle holding split mold 312, through-holes 321 for insertion of the guide shafts 320 are formed. The handle holding split mold 312 is mounted in the depression 319 of the final blow split mold 315, with the guide shafts 320 being inserted through the through-holes 321, so that the handle holding split mold 312 is configured to be movable by a predetermined distance along the guide shafts 320 within the depression 319. For example, in the present embodiment, as shown in FIG. 5, the handle holding split mold 312 is configured to be slidingly movable by a predetermined distance dl ranging from a wait position (wait state) to a push-in position (push-in state).

The respective actuator devices 313 (313A, 313B) are connected to the handle holding split molds 312 mounted in the above manner in the depression 319 of the final blow split molds 315 (315A, 315B). Each handle holding split mold 312 is configured to be individually slidable by the actuator device 313. The actuator device 313 is composed of a hydraulic cylinder, for example. Of course, the configuration of the actuator device 313 is not particularly limited, but may be such that the actuator device 313 can press each handle holding split mold 312 at a predetermined pressure.

Figure 8A:
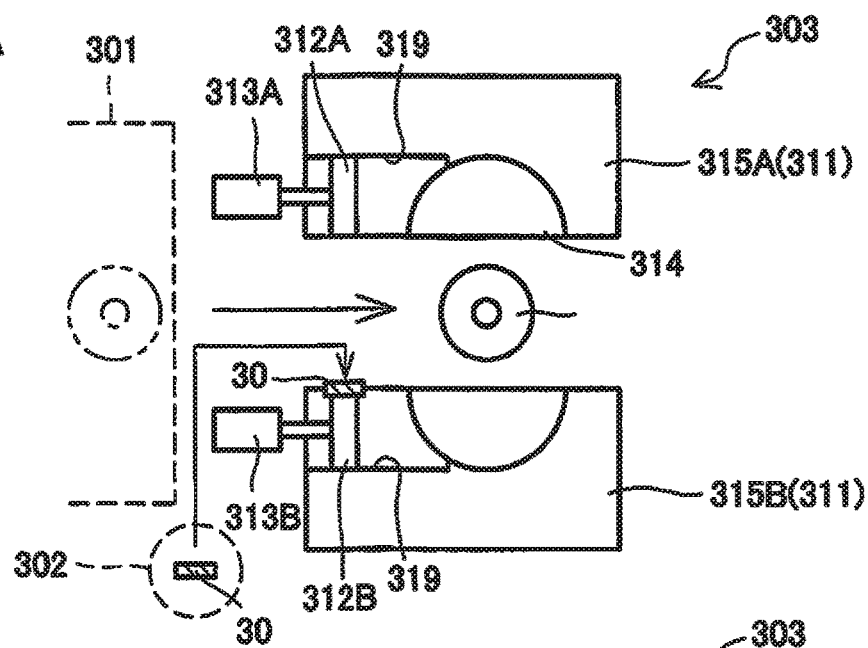
FIGS. 8A, 8B and 8C are schematic views illustrating the actions of the forming mold unit according to the embodiment of the present invention.

In the final blow molding section 303 of the above-described configuration, with the final blow split molds 315 being mold-opened, the intermediate molded product 61 is carried in between the final blow split molds 315 from the mounting section 301 by the transport means, while the handle 30 is mounted in one of the handle holding split molds 312 by the handle supply device 302, for example, as shown schematically in FIG. 8A.

Figure 8B:
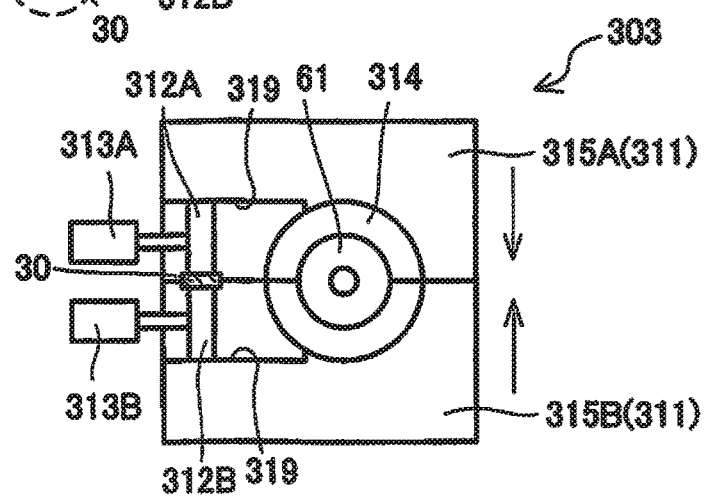

In this state, the final blow split molds 315 are mold-closed, whereby the intermediate molded product 61 is accommodated in the molding space 314, as shown in FIG. 8B. Simultaneously, the handle holding split molds 312 are mold-closed, with the result that the handle 30 is strongly held by the pair of handle holding split molds 312.

Figure 8C:
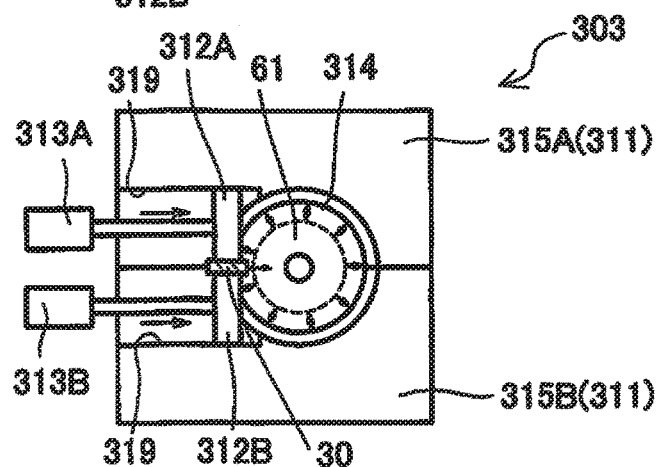

Then, high pressure air is introduced into the intermediate molded product 61 with the use of a blow nozzle to form the handle-equipped container 10. On this occasion, each handle holding split mold 312 is slidingly moved to a predetermined position beside the molding space 314 by the actuator device 313, at the timing of expansion of the intermediate molded product by an air blow, as shown in FIG. 8C. By so doing, the handle 30 held by the handle holding split molds 312 is pressed against the expanding intermediate molded product 61 at a predetermined timing. The handle holding split molds 312 are molds for forming the handle mounting portion 25 of the container body 20 and, at the same time that the handle 30 is pressed against the intermediate molding product 61, the handle holding split molds 312 form the handle mounting portion 25 (see FIG. 1).

As described above, when the intermediate molded product 61 is blow molded for forming the handle-equipped container 10, the handle 30 is pressed against the intermediate molded product 61. As a result, the handle 30 can be allowed to intrude into the intermediate molded product 61 (container body 20) expanding by blow molding, thus enhancing the mounting strength of the handle 30 with respect to the container body 20.

Figure 9A:
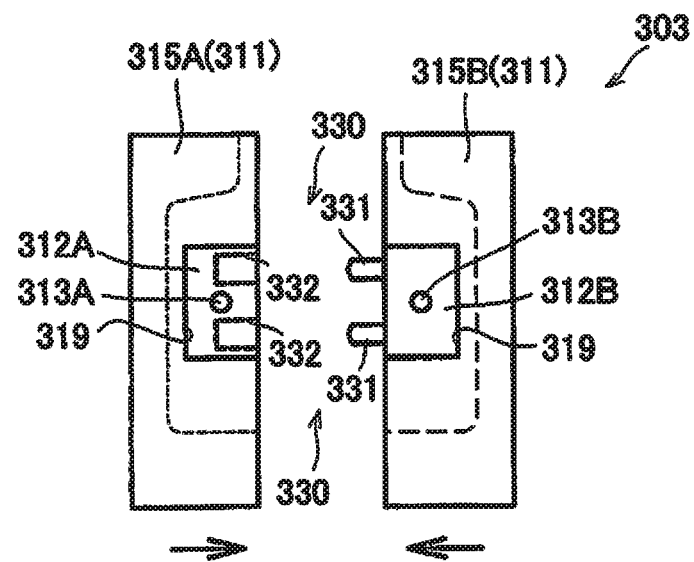
FIGS. 9A, 9B are schematic views of the forming mold unit illustrating a synchronization mechanism according to the embodiment of the present invention.
Figure 9B:
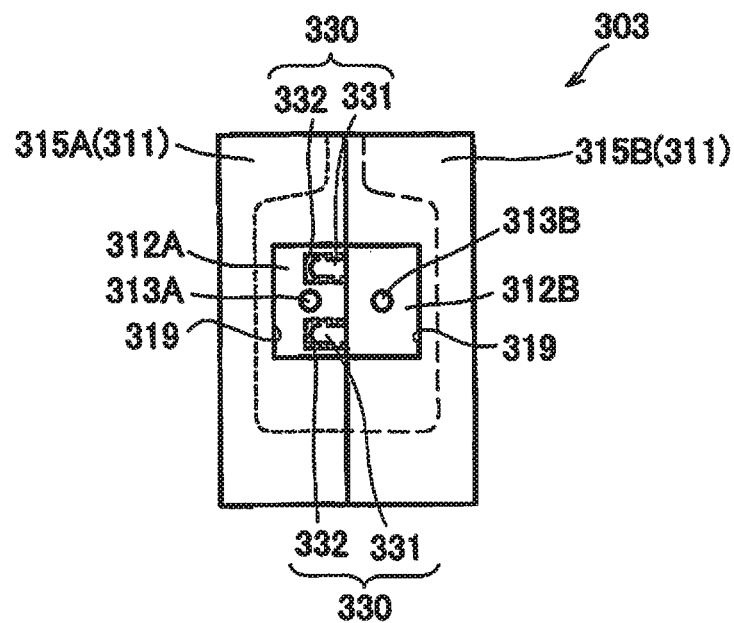

Preferably, the final blow molding section 303 according to the present embodiment is equipped with a synchronization mechanism for synchronizing the sliding movements of the pair of handle holding split molds 312. Such a feature can suppress a discrepancy between the slide amounts of the respective handle holding split molds 312 by the actuator devices 313, and can position the handle 30 highly accurately with respect to the container body 20. For example, a synchronization mechanism 330 is composed of a plurality of (e.g., two) engaging protrusions 331 provided in one of the handle holding split molds, 312B, and engaging recesses 332 provided in the other handle holding split mold 312A, as shown in FIGS. 9A, 9B. When the final blow split molds 315 are mold-closed, the plurality of engaging protrusions 331 are engaged with the engaging recesses 332, whereby the two handle holding split molds 312A, 312B are coupled together (FIG. 9B). In this state, the respective handle holding split molds 312A, 312B cannot be slidingly moved, independently of each other, by the actuator devices 313A, 313B connected to them. That is, the sliding movements of the two handle holding split molds 312A, 312B can be synchronized.

By providing the synchronization mechanism 330 in this manner, the sliding movements of the pair of handle holding split molds 312 can be synchronized using a relatively simple structure, so that the positioning of the handle 30 with respect to the container body 20 can be performed highly accurately.

The structure of the synchronization mechanism 330 is not particularly limited. In the foregoing example, for instance, the configuration in which the synchronization mechanisms 330 are provided at two locations of the handle holding split mold 312 is illustrated. However, the number of the synchronization mechanisms 330 is not particularly limited, but the synchronization mechanism may be provided at one location, or the synchronization mechanisms may be provided at three or more locations. Alternatively, the synchronization mechanism 330 may be, for example, composed of a ridge provided vertically continuously in one of the handle holding split molds 312, and a groove provided in the other handle holding split mold 312 and engaged with this ridge.

The final blow molding section 303, moreover, is preferably provided with an alignment mechanism which, during the sliding movement of the handle holding split mold 312, restricts the sliding movement of the handle holding split mold 312 so that the position of the handle 30 with respect to the container body 20 is constant; in the present embodiment, so that the handle 30 is always disposed near the center in the vertical direction and the right-left direction (first direction) of the container body 20.

Figure 10A:
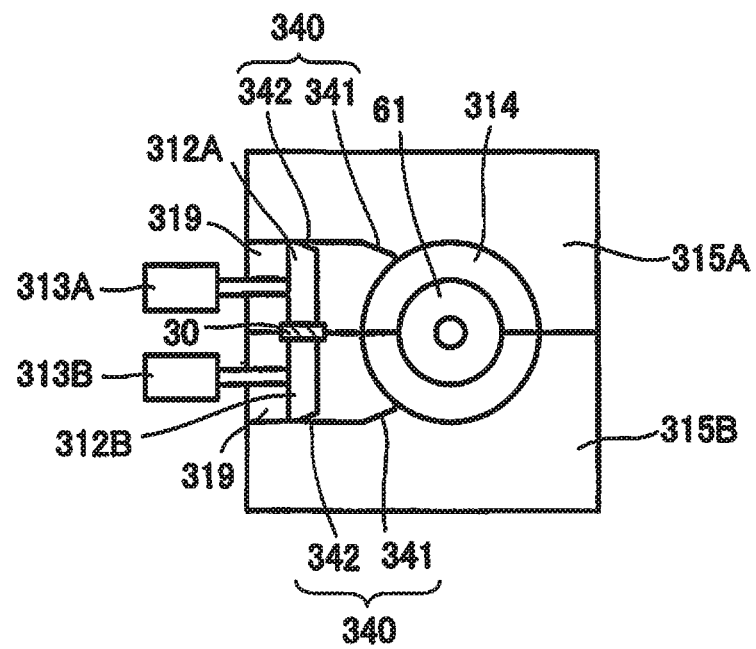
FIGS. 10A, 10B are schematic views of the forming mold unit illustrating an alignment mechanism according to the embodiment of the present invention.
Figure 10B:
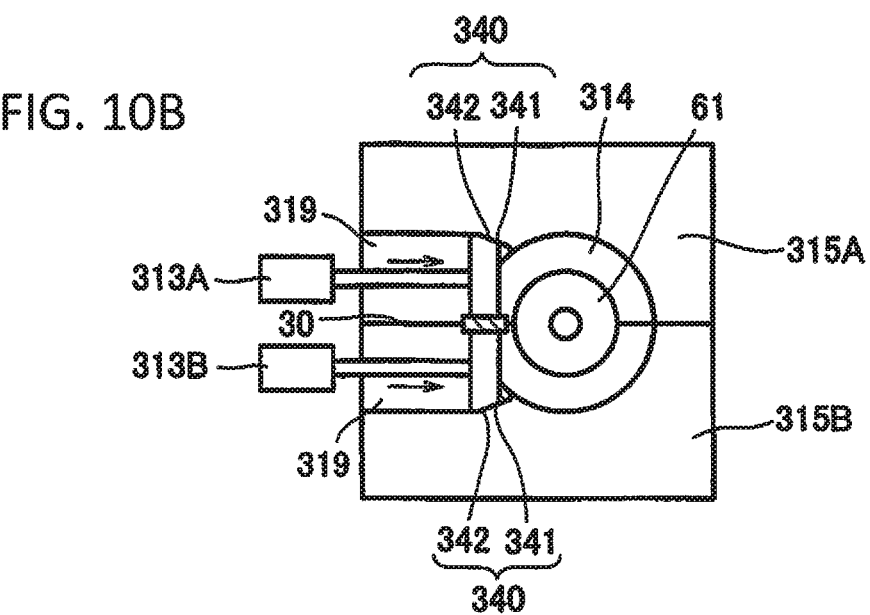

As shown in FIGS. 10A, 10B, for example, an alignment mechanism 340 is composed of a first inclined surface 341 constituting a part of the inner surface of the depression 319 formed in the final blow split mold 315, and a second inclined surface 342 formed in each handle holding split mold 312 and brought into contact with the first inclined surface 341 when the handle holding split mold 312 is slidingly moved. That is, when the handle holding split mold 312 is slidingly moved, the second inclined surface 342 of the handle holding split mold 312 contacts the first inclined surface 341 of the final blow split mold 315, and the second inclined surface 342 slides over the first inclined surface 341, whereupon the handle holding split mold 312 moves to a predetermined position (near the center of the container body 20). Thus, the position accuracy of the handle 30 with respect to the container body 20 is further improved.

In the example shown in FIGS. 10A, 10B, an explanation is presented for the alignment mechanisms 340 provided at both edges in the width direction (first direction) of the final blow split molds 315. However, the position of provision of the alignment mechanism 340 is not particularly limited. In the above embodiment, for example, the alignment mechanisms 340 are provided at both edges in the width direction (first direction) of the final blow split molds 315 (see FIG. 5), and are also provided at both edges in the vertical direction (i.e., at the upper and lower edges) of the final blow split molds 315 (see FIG. 6).

Figure 11:
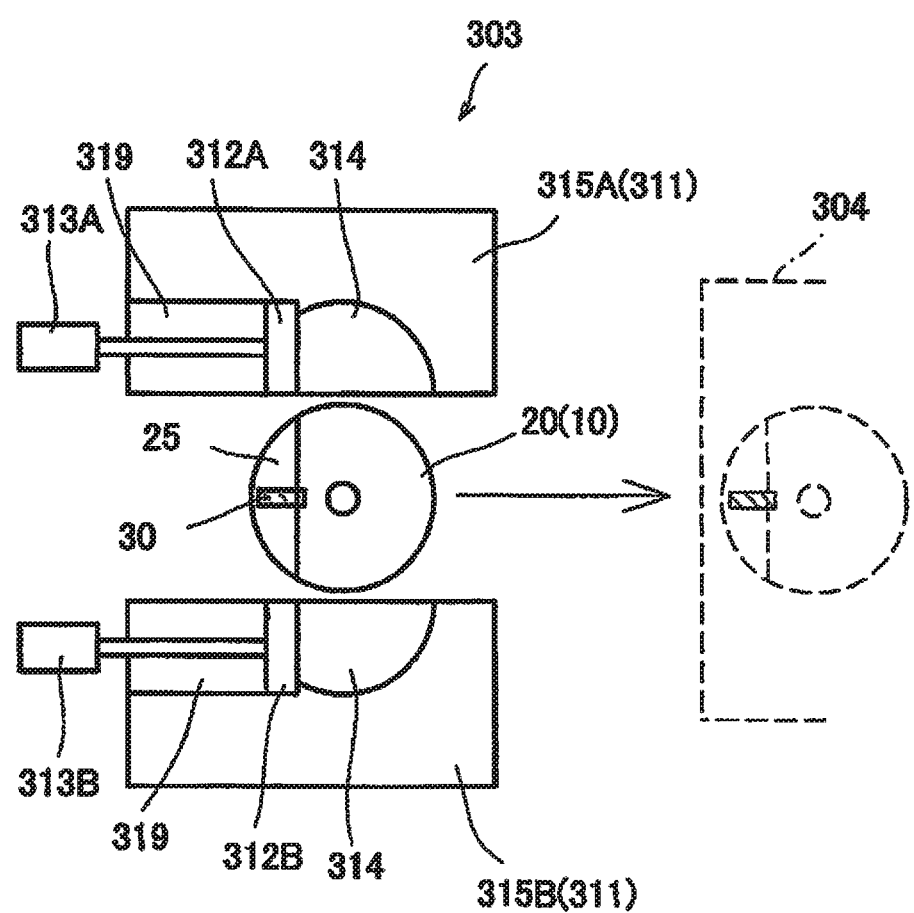
FIG. 11 is a schematic view illustrating the action of the forming mold unit according to the embodiment of the present invention.

In the final blow molding section 303, moreover, when the handle-equipped container 10 is molded by the final blow mold 311, the neck, etc. of the handle-equipped container 10 are held by the transport means (not shown). As shown in FIG. 11, the paired final blow split molds 315 are mold-opened, and the handle-equipped container 10 is passed through the mold-opened paired final blow split molds 315 and transported to the collecting section 304 by the transport means.

In the final blow molding section (forming mold apparatus) 303 according to the present invention, the handle 30 is held to be gripped by the pair of handle holding split molds 312 provided in the respective final blow split molds 315, and the actuator devices 313 are provided for the respective handle holding split molds 312. Thus, the production efficiency of the handle-equipped container 10 can be increased.

Concretely, with the manufacturing apparatus 100 for a handle-equipped container according to the present embodiment, there is no need to provide a device for carrying in the handle 30 laterally of the final blow mold 311, with the final blow split molds 315 being mold-opened. Thus, the intermediate molded product 61 can be carried into a space between the mold-opened final blow split molds 315 from one side of the final blow mold 311 (FIG. 8A). Furthermore, the handle-equipped container 10 molded by the final blow mold 311 can be carried out of the final blow mold 311 from the other side of the final blow mold 311 (FIG. 11). In the second manufacturing section 300, therefore, the transport of the intermediate molded product 61 from the mounting section 301 to the final blow molding section 303, and the transport of the handle-equipped container 10 from the final blow molding section 303 to the collecting section 304 can be synchronized, and the transport distances can be kept relatively short.

Besides, the supply of the handle 30 to the handle holding split molds 312 by the handle supply device 302 can also be performed in synchronization with the carry-in of the intermediate molded product 61 into the final blow split molds 315, and the carry-out of the molded handle-equipped container 10 from the final blow split molds 315. Thus, the handle-equipped container 10 can be formed in nearly the same period of time as a handle-less container, so that the reduction of the production time, an important requirement on the production line, can be achieved.

Figure 12:
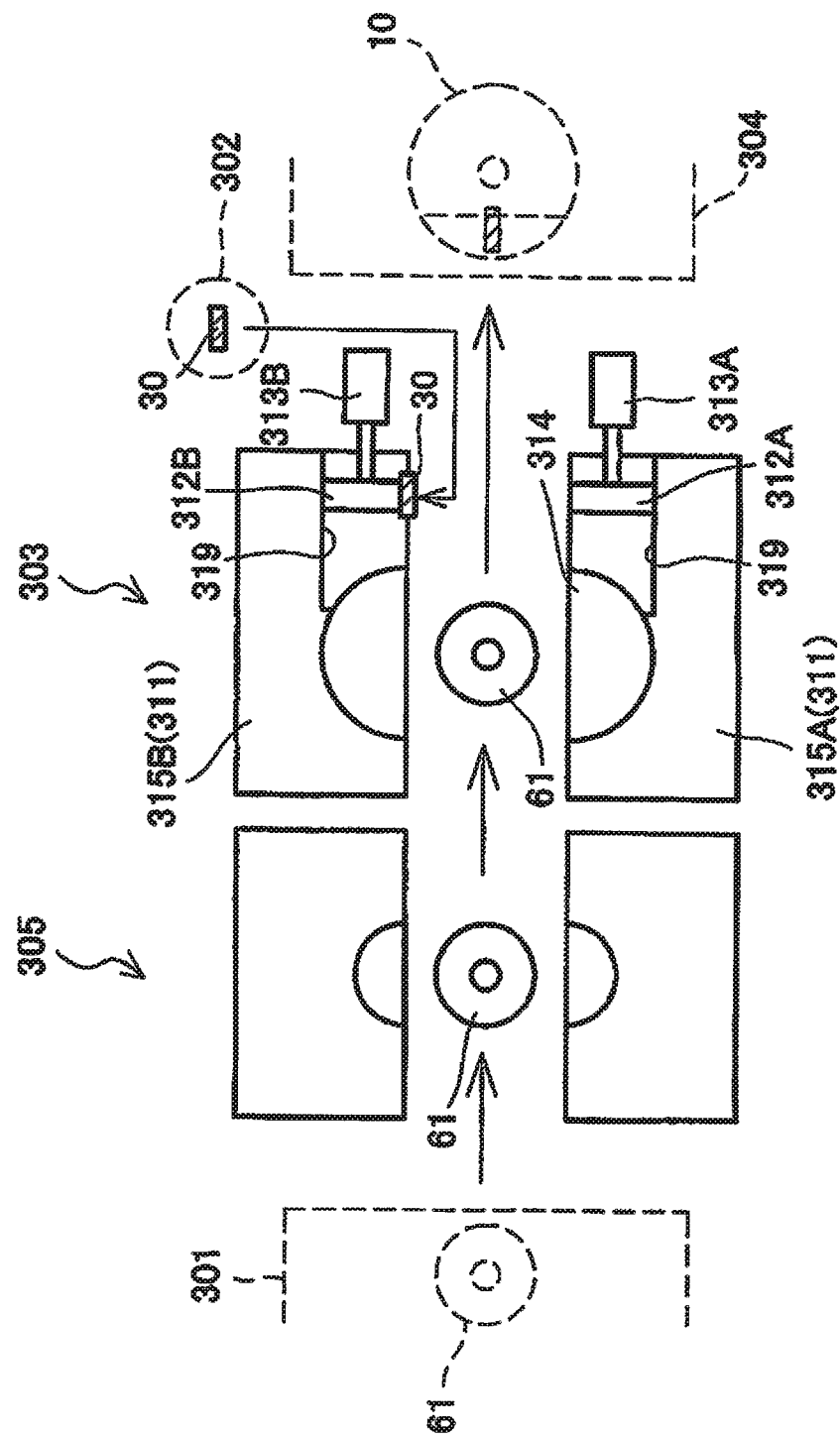
FIG. 12 is a schematic view illustrating a modification of the forming mold unit according to the embodiment of the present invention.

The manufacturing apparatus 100 for a handle-equipped container may have the heat treating blow molding section 305 between the mounting section 301 and the final blow molding section 303 (see FIG. 4B). In this case, it is preferred that the heat treating blow molding section 305 be rectilinearly disposed together with the final blow molding section 303 and the collecting section 304, as shown in FIG. 12. That is, the transport path is preferably in a linear form. Because of this configuration, the heat treating blow molding section 305 and the final blow molding section 303 can be arranged close to each other. Thus, the moving distance and the moving time of the intermediate molded product 61 can be shortened and, eventually, the production time of the handle-equipped container 10 can be reduced. Moreover, decreases in the temperature and the potential heat of the intermediate molded product 61 occurring during transport can be minimized, and the shapability in final blowing is also enhanced.

Furthermore, the transparency of the large container can also be improved. For example, a large container, such as a refillable bottle for mineral water of a size of 3 to 5 gallons (about 12 to 20 liters) has a wall thickness twice or more as large as a medium-sized to small container of a size of 0.5 to 2 liters. In producing a large container, therefore, if the intermediate molded product 61 is slowly cooled after heat-treating blowing, whitening happens owing to spherulite crystallization, and its transparency is liable to be impaired. Such a phenomenon tends to occur, particularly, at the thick-walled shoulder. According to the manufacturing apparatus 100 for a handle-equipped container in the above-described configuration, however, this phenomenon can be avoided.

The final blow molding section 303 is preferably disposed such that the actuator devices (driving means) 313 occupying a large space are located on the side of the collecting section 304. This disposition enables the heat treating blow molding section 305 and the final blow molding section 303 to be arranged more closely. Therefore, the moving distance and moving time of the intermediate molded product 61 can be shortened further.

The manufacturing apparatus 100 for a handle-equipped container is also configured to mount the handle 30 on one of the handle holding split molds 312 by the handle supply device 302 as stated above. Thus, the duration of supply of the handle 30 to the handle holding split mold 312 by the handle supply device 302 is relatively short. By arranging the heat treating blow molding section 305, the final blow molding section 303 and the collecting section 304 in the aforementioned manner (see FIG. 12), therefore, the carry-in of the intermediate molded product 61 into the final blow molding section 303, the supply of the handle 30 to the final blow molding section 303, and the carry-out of the handle-equipped container 10 from the final blow molding section 303 can be performed in synchronization. Thus, a further reduction in the production time of the handle-equipped container 10 can be achieved.

The embodiment of the present invention has been described as above. However, the present invention is not limited to such an embodiment, but changes and modifications can be made, as appropriate, without departing from the spirit and scope of the invention.

In the above embodiment, for example, the preform 60 is blow molded in the primary blow molding step, and then the intermediate molded product 61 is blow molded in the final blow molding step to form the handle-equipped container 10. To ensure molding stability and upgraded molding quality, however, pre-blowing of the preform 60 may be carried out prior to the primary blow molding step.

In the present embodiment, moreover, primary blow molding is performed to form the intermediate molded product, and then final blow molding is performed. However, primary blow molding need not necessarily be carried out. That is, in the final blow molding section, the preform, instead of the intermediate molded product, may be molded together with the handle to form the handle-equipped container.

The present invention is preferred, particularly, for the production of a large container having a volume such as 3 to 5 gallons (about 12 to 20 liters), but needless to say, is applicable to a smaller container than the container.

EXPLANATIONS OF LETTERS OR NUMERALS

10 Container
20 Container body
21 Trunk
22 Bottom
23 Shoulder
24 Mouth
25 Handle mounting portion
26 Chevron-shaped projection
27 Assemblage part
30 Handle
31 Grip portion
32 Fixing portion
33 Mounting bar part
34 Coupling part
35 Locking part
36 Engaging projection
37 Jutting part
38 Pressing piece
60 Preform
61 Intermediate molded product
61A Primary blow molded product
100 Manufacturing apparatus for handle-equipped container
200 First manufacturing section
201 Injection unit
202 Injection molding section
203 Temperature control section
204 Primary blow molding section
205 Withdrawal section
300 Second manufacturing section
301 Mounting section
302 Handle supply device
303 Final blow molding section (forming mold unit)
304 Collecting section
311 Final blow mold (forming mold)
312 Handle holding split mold
313 Actuator device (driving means)
314 Molding space
315 Final blow split mold (split mold body)
316 Raised bottom mold
317 Supply pipe
318 Discharge part
319 Depression
320 Guide shaft
321 Through-hole
330 Synchronization mechanism
331 Engaging protrusion
332 Engaging recess
340 Alignment mechanism
341 First inclined surface
342 Second inclined surface

The invention claimed is:

1. A forming mold unit for forming a handle-equipped container by blow molding an intermediate molded product, while disposing the intermediate molded product and a handle for a container within a forming mold, wherein the forming mold comprises:
    a pair of split mold bodies in which the intermediate molded product is accommodated;
    a pair of handle holding split molds provided in the split mold bodies so as to be slidable in a direction orthogonal to an opening and closing direction of the split mold bodies, and sandwiching the handle therebetween; and
    a driving device connected to the handle holding split molds for sliding the handle holding split molds individually.

2. The forming mold unit according to claim 1, further comprising
    a synchronization mechanism for synchronizing sliding movements of the pair of handle holding split molds.

3. The forming mold unit according to claim 2, wherein the synchronization mechanism is composed of an engaging protrusion provided in one of the handle holding split molds, and an engaging recess provided in another of the handle holding split molds for engagement with the engaging protrusion.

4. A manufacturing apparatus for a handle-equipped container, comprising a forming mold unit for forming a handle-equipped container by blow molding an intermediate molded product, while disposing the intermediate molded product and a handle for a container within a forming mold, comprising: (i) a first manufacturing section at which the intermediate molded product is produced, and (ii) a second manufacturing section comprising the forming mold, wherein the forming mold comprises:
 a pair of split mold bodies in which the intermediate molded product is accommodated;
 a pair of handle holding split molds provided in the split mold bodies so as to be slidable in a direction orthogonal to an opening and closing direction of the split mold bodies, and sandwiching the handle therebetween; and
 a driving device connected to the handle holding split molds for sliding the handle holding split molds individually.

5. The manufacturing apparatus for a handle-equipped container according to claim 4, further comprising
 a transporter that performs carry-out of the handle-equipped container from the forming mold, and transport of the intermediate molded product from the first manufacturing section to the forming mold, simultaneously in the direction orthogonal to the opening and closing direction of the split mold bodies.

6. A forming mold unit for forming a handle-equipped container by blow molding an intermediate molded product, while disposing the intermediate molded product and a handle for a container within a forming mold, wherein the forming mold comprises:
 a pair of split mold bodies in which the intermediate molded product is accommodated;
 a pair of handle holding split molds provided in the split mold bodies so as to be slidable in a direction orthogonal to an opening and closing direction of the split mold bodies, and sandwiching the handle therebetween; and
 an actuator device connected to the handle holding split molds, wherein the handle holding split molds are slid individually in response to operation of the actuator.

7. The forming mold unit according to claim 6, further comprising
 a mechanical linkage such that sliding movements of the pair of handle holding split molds are synchronized.

8. The forming mold unit according to claim 7, wherein the mechanical linkage is composed of an engaging protrusion provided in one of the handle holding split molds, and an engaging recess provided in another of the handle holding split molds for engagement with the engaging protrusion.

9. A manufacturing apparatus for a handle-equipped container, comprising a forming mold unit for forming a handle-equipped container by blow molding an intermediate molded product, while disposing the intermediate molded product and a handle for a container within a forming mold, comprising: (i) a first manufacturing section at which the intermediate molded product is produced, and (ii) a second manufacturing section comprising the forming mold, wherein the forming mold comprises:
 a pair of split mold bodies in which the intermediate molded product is accommodated;
 a pair of handle holding split molds provided in the split mold bodies so as to be slidable in a direction orthogonal to an opening and closing direction of the split mold bodies, and sandwiching the handle therebetween; and
 an actuator device connected to the handle holding split molds, wherein the handle holding split molds are slid individually in response to operation of the actuator.

10. The manufacturing apparatus for a handle-equipped container according to claim 9, further comprising
 a transporter that performs carry-out of the handle-equipped container from the forming mold, and transport of the intermediate molded product from the first manufacturing section to the forming mold, simultaneously in the direction orthogonal to the opening and closing direction of the split mold bodies.

* * * * *